United States Patent
Horiike

(10) Patent No.: US 10,100,925 B2
(45) Date of Patent: Oct. 16, 2018

(54) CONTROL DEVICE FOR AUTOMATIC TRANSMISSION OF VEHICLE AND CONTROL METHOD FOR AUTOMATIC TRANSMISSION OF VEHICLE

(71) Applicant: TOYOTA JIDOSHA KABUSHIKI KAISHA, Toyota-shi, Aichi-ken (JP)

(72) Inventor: Kenta Horiike, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 15/246,050

(22) Filed: Aug. 24, 2016

(65) Prior Publication Data

US 2017/0059036 A1    Mar. 2, 2017

(30) Foreign Application Priority Data

Aug. 28, 2015  (JP) ................................. 2015-169792

(51) Int. Cl.
| | |
|---|---|
| *F16H 61/04* | (2006.01) |
| *F16H 61/686* | (2006.01) |
| *F16H 3/66* | (2006.01) |

(52) U.S. Cl.
CPC ......... *F16H 61/04* (2013.01); *F16H 61/0437* (2013.01); *F16H 3/663* (2013.01); *F16H 61/686* (2013.01); *F16H 2061/0429* (2013.01); *F16H 2061/0488* (2013.01); *F16H 2200/0052* (2013.01); *F16H 2200/2007* (2013.01); *F16H 2200/2023* (2013.01); *F16H 2200/2043* (2013.01); *F16H 2312/02* (2013.01)

(58) Field of Classification Search
USPC ........................................................ 477/116
See application file for complete search history.

(56) References Cited

U.S. PATENT DOCUMENTS

| | | | |
|---|---|---|---|
| 5,749,805 A | 5/1998 | Shimada et al. | |
| 5,810,694 A * | 9/1998 | Kamada | F16H 61/0021 |
| | | | 477/117 |
| 6,634,988 B2 * | 10/2003 | Shultz | F16H 61/0437 |
| | | | 477/114 |
| 2011/0253919 A1 * | 10/2011 | Imamura | F16H 61/0251 |
| | | | 251/129.15 |

(Continued)

FOREIGN PATENT DOCUMENTS

| | | |
|---|---|---|
| DE | 69627729 T2 | 11/2003 |
| EP | 0962651 A1 | 12/1999 |

(Continued)

*Primary Examiner* — Jacob S. Scott
*Assistant Examiner* — Timothy Hannon
(74) *Attorney, Agent, or Firm* — Oliff PLC

(57) ABSTRACT

After engagement of a clutch is suppressed from being started and a rotational speed of an input shaft of an automatic transmission is suppressed from being increased due to an increase in rotation resistance of the input shaft of the automatic transmission, which occurs by half-engagement of a clutch, the clutch is disengaged, and the clutch is completely engaged. In this way, the clutch is completely engaged after the rotational speed of the input shaft is suppressed from being increased. Thus, a heat generation amount of the clutch can be reduced, and furthermore, durability of the clutch can be improved by a reduction in the heat generation amount.

5 Claims, 8 Drawing Sheets

(56) References Cited

U.S. PATENT DOCUMENTS

2011/0315499 A1\* 12/2011 Fukushiro ............. F16H 61/061
 192/3.57
2015/0148180 A1\* 5/2015 Otake ....................... F16H 3/66
 475/276

FOREIGN PATENT DOCUMENTS

| JP | H11-351001 A | 12/1999 |
| JP | 2014-062581 A | 4/2014 |

\* cited by examiner

FIG. 2

| GS | C1 | C2 | B1 | B2 | B3 |
|---|---|---|---|---|---|
| 1ST | O | × | × | O | × |
| 2ND | O | × | O | × | × |
| 3RD | O | × | × | × | O |
| 4TH | O | O | × | × | × |
| 5TH | × | O | × | × | O |
| 6TH | × | O | O | × | × |
| R | × | × | × | O | O |
| N | × | × | × | × | × |

O ENGAGEMENT
× DISENGAGEMENT

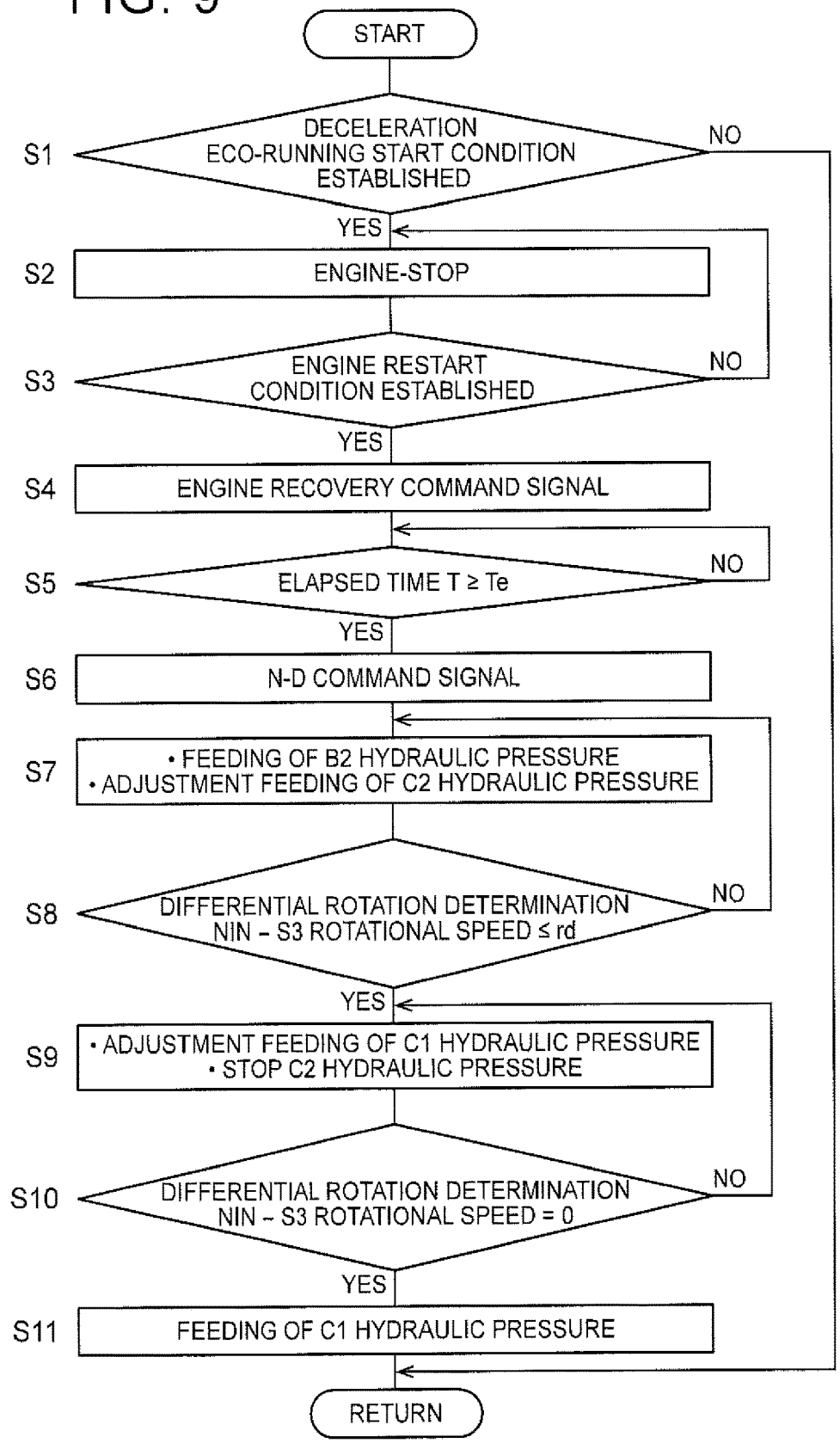

CONTROL DEVICE FOR AUTOMATIC TRANSMISSION OF VEHICLE AND CONTROL METHOD FOR AUTOMATIC TRANSMISSION OF VEHICLE

INCORPORATION BY REFERENCE

The disclosure of Japanese Patent Application No. 2015-169792 filed on Aug. 28, 2015 including the specification, drawings and abstract is incorporated herein by reference in its entirety.

BACKGROUND

1. Technical Field

The present disclosure relates to a control device and a control method for an automatic transmission of a vehicle.

2. Description of Related Art

When an engine of a vehicle that includes an automatic transmission is restarted after being stopped, there is a case where an accelerator pedal is depressed when the transmission is in a neutral state. This causes generation of an engagement shock and degradation in durability of a friction engagement device. Japanese Patent Application Publication No. 11-351001 (JP 11-351001 A) discloses control of the friction engagement device for purposes of reducing the engagement shock and suppressing the degradation in the durability of the friction engagement device. More specifically, JP 11-351001 A discloses a technique for reducing the engagement shock and suppressing the degradation in the durability of the friction engagement device by executing torque down control of the engine under such a condition that an accelerator is turned on in a state where braking of the vehicle is applied.

SUMMARY

In the case where the torque down control is executed when the engine is restarted under such a condition that the accelerator is turned on while braking of the vehicle is applied, the degradation in the durability of the friction engagement device can be suppressed. However, due to reduction in engine torque, startability of the vehicle is possibly degraded.

The present disclosure provides a control device and a control method for an automatic transmission of a vehicle capable of reducing heat generated by friction of a starting friction engagement device used to establish a starting gear, without degrading vehicle startability in the automatic transmission of the vehicle in which one gear of a plurality of gears is established when any of a plurality of friction engagement devices is selectively engaged.

An aspect of the present disclosure provides a control device for an automatic transmission of a vehicle. The automatic transmission includes a plurality of friction engagement devices, an input shaft, an output member, and a non-rotational member. The plurality of friction engagement devices includes a first friction engagement device, a second friction engagement device, and a third friction engagement device, a first gear being established when the first friction engagement device is engaged. The automatic transmission includes planetary gear devices. The planetary gear devices includes carriers, sun gears, and ring gears. The carrier is configured to be coupled to the output member. The sun gear is configured to be selectively coupled to the input shaft via the first friction engagement device. The ring gear is configured to be selectively coupled to the input shaft via the second friction engagement device and be selectively coupled to the non-rotational member via the third friction engagement device. The control device includes, in a process of switching the automatic transmission from a neutral state to a power transmission state, none of gears being established in the neutral state and the first gear being established in the power transmission state, an electronic control unit is configured to: control the second friction engagement device to be temporarily half-engaged prior to complete engagement of the first friction engagement device, the second friction engagement device being not related to establishment of the first gear; and start engaging the third friction engagement device and start engaging the second friction engagement device, in response to a start of a gear change from the neutral state to the first gear.

In the control device, the electronic control unit may be configured to start engaging the first friction engagement device after reducing differential rotation between an input-side rotational speed and an output-side rotational speed of the first friction engagement device to be at most equal to a specified determination value by the half-engagement of the second friction engagement device.

According to the above configuration, in a process where the first gear is established by engagement of the first friction engagement device from a neutral state where none of gears of the automatic transmission is established, the second friction engagement device and the third friction engagement device that are coupled in series between the input shaft and the non-rotational member function as brakes. Thus, prior to complete engagement of the first friction engagement device, the third friction engagement device is engaged, and the second friction engagement device is half-engaged. In this way, rotation resistance of the input shaft is increased, and a rotational speed of the input shaft is reduced prior to establishment of the first gear. Accordingly, the first friction engagement device is completely engaged after the rotational speed of the input shaft is reduced. Therefore, a heat generation amount of the first friction engagement device can be reduced, and furthermore, durability of the first friction engagement device can further be improved by a reduction in the heat generation amount.

According to the above configuration, the engagement of the first friction engagement device is started after the differential rotation between the input-side rotational speed and the output-side rotational speed of the first friction engagement device is reduced to be at most equal to a specified determination value by the half-engagement of the second friction engagement device. Therefore, a starting shock due to the engagement of the first friction engagement device can be reduced, and abnormal sound in a drive system can also be reduced.

Another aspect of the present disclosure provides a control method for an automatic transmission of a vehicle. The automatic transmission includes a plurality of friction engagement devices, an input shaft, an output member, and a non-rotational member. The plurality of friction engagement devices includes a first friction engagement device, a second friction engagement device, and a third friction engagement device, a first gear being established when the first friction engagement device is engaged. The automatic transmission includes planetary gear devices. The planetary gear devices include carriers, sun gears, and ring gears. The carrier is configured to be coupled to the output member. The sun gear is configured to be selectively coupled to the input shaft via the first friction engagement device. The ring gear is configured to be selectively coupled to the input shaft via the second friction engagement device and be selectively coupled to the non-rotational member via the third friction engagement device. The control method includes: in a process of switching the automatic transmission from a neutral state to a power transmission state, none of gears being established in the neutral state and the first gear being established in the power transmission state, temporarily half-engaging the second friction engagement device prior to completing engagement of the first friction engagement device, the second friction engagement device being not related to establishment of the first gear; and starting engagement of the third friction engagement device and starting engagement of the second friction engagement device, in response to a start of a gear change from the neutral state to the first gear.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is an operation table for explaining combinations of operations of friction engagement devices when any of a plurality of gears of the automatic transmission in FIG. 1 is established;

FIG. 3 is a block diagram for explaining main components of an electric control system that is provided in the vehicle to control the automatic transmission in FIG. 1 and the like;

FIG. 9 is a flowchart for explaining main parts of the operation of the friction engagement device in FIG. 1 when the friction engagement device is switched from the neutral state to the drive state by the accelerator-on operation during the deceleration eco-running.

DETAILED DESCRIPTION OF EMBODIMENTS

A detailed description will hereinafter be made on an embodiment with reference to the drawings.

Figure 1:
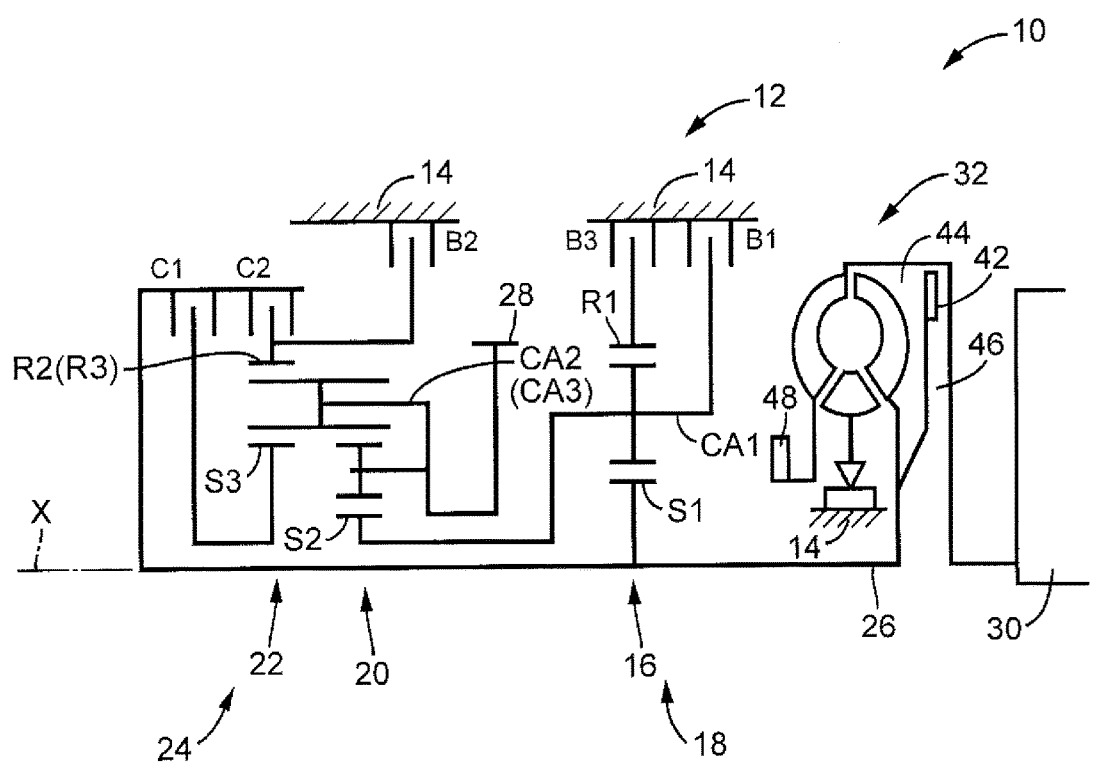
FIG. 1 is a skeletal view for explaining a configuration of an automatic transmission that is provided in a vehicle according to an embodiment.
Figure 3:
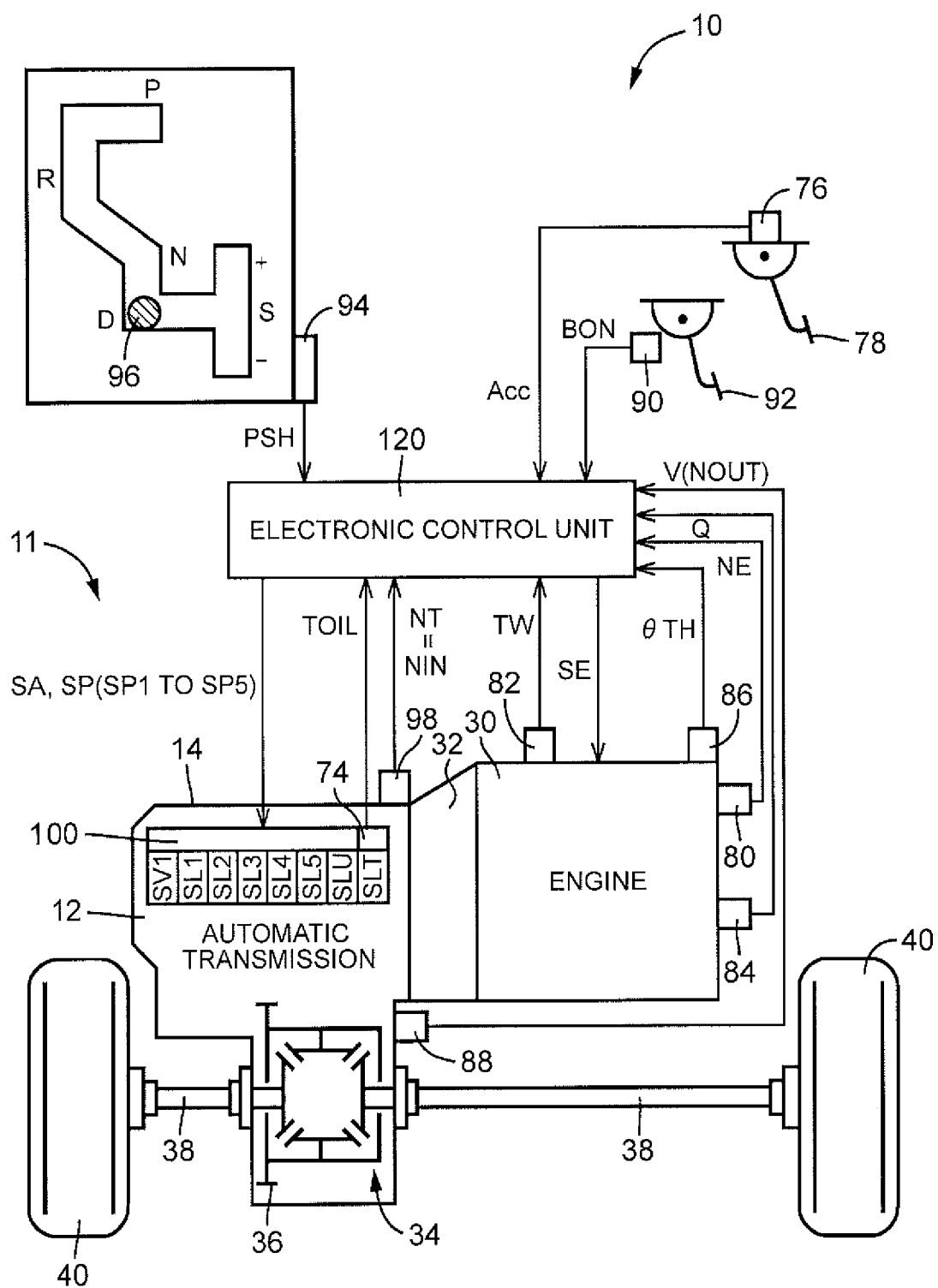

FIG. 1 is a skeletal view for explaining a schematic configuration of an automatic transmission 12 that is provided in a vehicle 10 according to the embodiment. FIG. 2 is an operation table for explaining operation states of friction engagement devices when any of a plurality of gears GS (transmission gears GS) of the automatic transmission 12 is established. The automatic transmission 12 is suitably used for a front-engine, front-wheel-drive (FF) vehicle. The automatic transmission 12 has a first gear change section 18 and a second gear change section 24 on a common axis X in a transaxle case 14 (hereinafter a case 14) which is a non-rotational member that is attached to a vehicle body. The automatic transmission 12 changes a speed of rotation of an input shaft 26 and outputs the rotation from an output gear 28 that functions as an output member. The first gear change section 18 is configured by including a first planetary gear device 16 of a single pinion type as a main component. The second gear change section 24 is configured as a Ravigneaux type by including a second planetary gear device 20 of a double pinion type and a third planetary gear device 22 of the single pinion type as main components. The input shaft 26 is one example of an input rotational member of the automatic transmission 12. The input shaft 26 is integrally constructed with a turbine shaft of a torque converter 32 as a fluid-type transmission device that is rotationally driven by an engine 30. The engine 30 is a drive power source in this embodiment. The output gear 28 corresponds to an output rotational member of the automatic transmission 12 and functions as a counter drive gear that meshes with a counter driven gear and constitutes a counter gear pair so as to transmit the power to a differential gear device 34, which is shown in FIG. 3, in this embodiment, for example. The counter driven gear is coaxially arranged with a differential drive pinion that meshes with a differential ring gear 36 and constitutes a final gear pair. As shown in FIG. 3, output of the engine 30 is transmitted to right and left drive wheels 40 successively via a power transmission device 11 for the vehicle that includes the torque converter 32, the automatic transmission 12, the differential gear device 34, a pair of axles 38, and the like in this order. It should be noted that the automatic transmission 12 and the torque converter 32 are configured to be substantially symmetrical about the center line (the axis) X, and lower half portions thereof from the axis X are not shown in the skeletal view in FIG. 1.

The torque converter 32 includes a lockup clutch 42 that directly transmits the power of the engine 30 to the input shaft 26 without interposing a fluid. This lockup clutch 42 is a hydraulic friction clutch that is frictionally engaged by differential pressure $\Delta P$ between hydraulic pressure in an engagement-side oil chamber 44 and hydraulic pressure in a disengagement-side oil chamber 46, and, by complete engagement (lockup-on) thereof, the power of the engine 30 is directly transmitted to the input shaft 26. In addition, the differential pressure $\Delta P$, that is, a torque transmission capacity is subjected to feedback control such that the lockup clutch 42 is engaged in a specified slipped state when necessary.

In accordance with a combination of coupling states of any of rotation elements (sun gears S1, S2, S3, carriers CA1, CA2, CA3, ring gears R1, R2, R3) in the first gear change section 18 and the second gear change section 24, the automatic transmission 12 establishes six forward gears (forward transmission gears) from a first gear "1st" to a sixth gear "6th" and also establishes a reverse gear (reverse transmission gear) of a reverse gear "R". As shown in FIG. 2, regarding the forward gears, for example, the first gear (1st), the second gear (2nd), the third gear (3rd), the fourth gear (4th), the fifth gear (5th), and the sixth gear (6th) are respectively established by engagement between a clutch C1 and a brake B2, engagement between the clutch C1 and a brake B1, engagement between the clutch C1 and a brake B3, engagement between the clutch C1 and a clutch C2, engagement between the clutch C2 and the brake B3, and engagement between the clutch C2 and the brake B1. It is configured that the reverse gear (R) is established by engagement between the brake B2 and the brake B3, and that disengagement of all of the clutches C1, C2 and the brakes B1, B2, B3 leads to a neutral state (N). A mechanical oil pump 48 that generates operating hydraulic pressure when being rotationally driven by the engine 30 is provided in the case 14, and the operating hydraulic pressure is source pressure for operating the above clutches C1, C2 and brakes B1, B2, B3. In this embodiment, the clutch C1 is one example of the first friction engagement device and is also referred to as a starting clutch.

The operation table in FIG. 2 summarizes relationships between each of the above gears GS and an operation state of each of hydraulic friction engagement devices, that is, the clutches C1, C2 and the brakes B1, B2, B3, A "circle" indicates engagement, and a "cross mark" indicates disengagement. Each of the above clutches C1, C2 and brakes B1, B2, B3 (hereinafter, simply referred to as a clutch C and a brake B unless otherwise specifically distinguished) is the hydraulic friction engagement device whose engagement is controlled by a hydraulic actuator, such as a multiplate clutch or a multiplate brake, and which transmits the power of the engine 30 to the drive wheel 40 side when being engaged. By excitation, non-excitation, and current control of linear solenoid valves SL1 to SL5 (see FIGS. 3, 4) in a hydraulic pressure control circuit 100, the engaged state and the disengaged state of each of the clutch C and the brake B are switched, and transient operating hydraulic pressure during the engagement, the transient operating hydraulic pressure during the disengagement, and the like are controlled. In addition, by excitation, non-excitation, and current control of an on/off solenoid valve SV1, accumulation of the hydraulic pressure in an accumulator ACM and feeding of the hydraulic pressure from the accumulator ACM to each of the hydraulic friction engagement devices are switched.

FIG. 3 is a block diagram for explaining main components of an electric control system that is provided in the vehicle 10 to control the engine 30, the automatic transmission 12, and the like. In FIG. 3, the vehicle 10 includes an electronic control unit 120 that has a hydraulic pressure control device related to deceleration eco-running control and the like of the automatic transmission 12, for example. The electronic control unit 120 is configured by including a so-called microcomputer that has, for example, a CPU, a RAM, a ROM, input and output interfaces, and the like. The CPU performs signal processing in accordance with a program that is stored in the ROM in advance while using a temporary storage function of the RAM. In this way, the CPU executes output control of the engine 30, gear change control of the automatic transmission 12, and the like. When necessary, the CPU is configured to be divided into an engine control device for controlling the engine, the hydraulic pressure control device for the gear change control that controls the linear solenoid valves SL1 to SL5 and the on/off solenoid valve SV1 in the hydraulic pressure control circuit 100, and the like.

The electronic control unit 120 is supplied with, for example: a signal indicative of an operating oil temperature TOIL (CC) that is a temperature of operating oil (for example, automatic transmission oil) in the hydraulic pressure control circuit 100 and that is detected by an operating oil temperature sensor 74; a signal indicative of an accelerator operation amount Acc (%) that is an operation amount of an accelerator pedal 78 as a request amount by a driver to the vehicle 10 (a driver request amount) and that is detected by an accelerator operation amount sensor 76; a signal indicative of an engine speed NE (rpm), that is a speed of the engine 30 detected by an engine speed sensor 80; a signal indicative of a coolant temperature TW (° C.) of the engine 30 that is detected by a coolant temperature sensor 82; a signal indicative of an intake air amount Q/N of the engine 30 that is detected by an intake air amount sensor 84; a signal indicative of a throttle valve opening degree θTH (%) that is an opening degree of an electronic throttle valve and that is detected by a throttle valve opening degree sensor 86; a signal indicative of an output rotational speed NOUT (rpm) that is a rotational speed of the output gear 28 corresponding to a vehicle speed V (km/h) detected by a vehicle speed sensor 88; a signal indicative of an operation (on) BON of a foot brake pedal 92 that indicates a foot brake as a normal brake is currently operated (currently depressed) and that is detected by a brake switch 90; a signal indicative of a lever position (an operated position, a shift position) PSH of a shift lever 96 that is detected by a lever position sensor 94; a signal indicative of a turbine rotational speed NT (rpm) that is a rotational speed of a turbine of the torque converter 32 and that is detected by a turbine rotational speed sensor 98 (that is, an input shaft rotational speed NIN as a rotational speed of the input shaft 26); and the like.

Meanwhile, the electronic control unit 120 outputs an engine output control command signal SE for the output control of the engine 30 that includes, for example: a drive signal that is transmitted to a throttle actuator so as to control opening/closing of the electronic throttle valve in accordance with the accelerator operation amount Acc; an injection signal for controlling a fuel injection amount that is injected from a fuel injector; an ignition timing signal for controlling ignition timing of the engine 30 by an igniter; and the like. In addition, the electronic control unit 120 outputs hydraulic pressure control command signals SA, SP (SP1, SP2, SP3, SP4, SP5) for the gear change control of the automatic transmission 12 that include, for example: a valve command signal (a hydraulic pressure command value, a drive signal) for controlling the excitation, the non-excitation, and the like of the linear solenoid valves SL1 to SL5 and the on/off solenoid valve SV1 in the hydraulic pressure control circuit 100 so as to switch the gear GS of the automatic transmission 12; a drive signal for adjustment control of line hydraulic pressure PL; and the like.

The shift lever 96 is disposed near a driver seat, for example, and is manually operated to any of the five operating positions "P", "R", "N", "D", and "S" as shown in FIG. 3.

The "P" position (range) is a parking position (location) that is used to bring the neutral state and at which rotation of the output gear 28 is mechanically inhibited (locked) by a mechanical parking mechanism. In the neutral state, none of the gears of the automatic transmission 12 is established, and power transmission in the automatic transmission 12 is blocked. The "R" position is a reverse travel position (location) for establishing the reverse gear at which a rotational direction of the output gear 28 of the automatic transmission 12 is reversed. The "N" position is a neutral position (location) that is used to bring the neutral state where the power transmission in the automatic transmission 12 is blocked. The "D" position is a forward travel position (location) at which automatic gear change control is executed by using all of the forward gears from the first gear "1st" to the sixth gear "6th" within a transmission gear range (a D range) where the gear change of the automatic transmission 12 is permitted. The "S" position is an engine brake position (location) at which the gear can be changed manually by switching among a plurality of types of transmission gear ranges, each of which limits a change range of the gear, that is, the plurality of types of the transmission gear ranges in which the gears on the high vehicle speed side differ.

Figure 4:
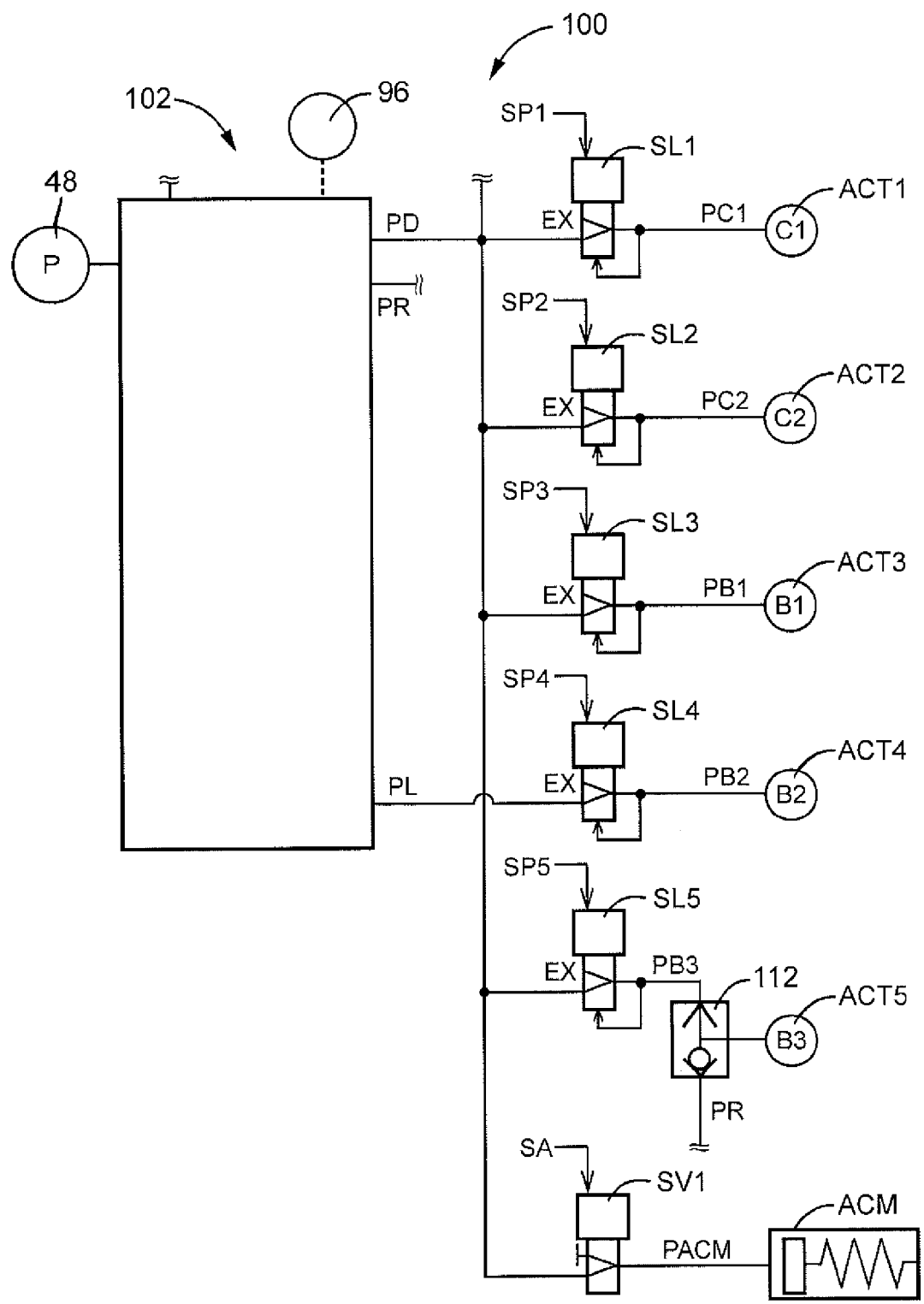
FIG. 4 is a circuit diagram that is related to linear solenoid valves for controlling operations of hydraulic actuators of clutches and brakes in a hydraulic pressure control circuit in FIG. 3.

FIG. 4 is a view of main portions of the hydraulic pressure control circuit that are related to the linear solenoid valves SL1 to SL5 and the on/off solenoid valve SV1 in the hydraulic pressure control circuit 100, with the linear solenoid valves SL1 to SL5 respectively controlling operations of hydraulic actuators (hydraulic cylinders) ACT1 to ACT5 of the clutches C1, C2 and the brakes B1, B2, B3, and with the on/off solenoid valve SV1 controlling operation of the accumulator ACM that functions as a hydraulic pressure source when the engine 30 is stopped.

In FIG. 4, a hydraulic pressure supply device 102 includes: a regulator valve for adjusting the line hydraulic pressure by using the hydraulic pressure generated from the mechanical oil pump 48 that is rotationally driven by the engine 30 as the source pressure; a manual valve that mechanically or electrically switches an oil passage on the basis of an operation of the shift lever 96; and the like. For example, this manual valve outputs the line hydraulic pressure PL (MPa) that is input to the manual valve as drive hydraulic pressure PD (MPa) at a time when the shift lever 96 is operated to the "D" position or the "S" position. The manual valve also outputs the input line hydraulic pressure PL as reverse hydraulic pressure PR (MPa) at a time when the shift lever 96 is operated to the "R" position, and blocks output of the hydraulic pressure (guides the drive hydraulic pressure PD or the reverse hydraulic pressure PR to a discharge side) at a time when the shift lever 96 is operated to the "P" position or the "N" position. Just as described, the hydraulic pressure supply device 102 outputs the line hydraulic pressure PL, the drive hydraulic pressure PD, and the reverse hydraulic pressure PR.

The hydraulic pressure control circuit 100 is provided with the linear solenoid valves SL1 to SL5 (hereinafter described as a linear solenoid valve SL unless otherwise specifically distinguished) and the on/off solenoid valve SV1 that respectively correspond to the hydraulic actuator ACT1 to ACT5 and the accumulator ACM. The drive hydraulic pressure PD fed from the hydraulic pressure supply device 102 is adjusted to become operating hydraulic pressure PC1, PC2, PB1, PB3, PACM (MPa) that correspond to the command signals SA, SP (SP1, SP2, SP3, SP4, SP5) from the electronic control unit 120, and is directly supplied to the hydraulic actuators ACT1, ACT2, ACT5, ACT5 and the accumulator ACM by the linear solenoid valves SL1, SL2, SL3, SL5 and the on/off solenoid valve SV1 respectively corresponding thereto. The line hydraulic pressure PL fed from the hydraulic pressure supply device 102 is adjusted to become operating hydraulic pressure PB2 that corresponds to the command signal from the electronic control unit 120, and is directly supplied to the hydraulic actuator ACT4 by the corresponding linear solenoid valve SL4. It should be noted that either the operating hydraulic pressure PB3 adjusted by the linear solenoid valve SL5 or the reverse hydraulic pressure PR is supplied to the hydraulic actuator ACT5 of the brake B3 via a shuttle valve 112.

The linear solenoid valves SL1 to SL5 basically have the same configuration, and the on/off solenoid valve SV1 is a solenoid valve that is driven to be on or off. The linear solenoid valves SL1 to SL5 and the on/off solenoid valve SV1 are independently excited, unexcited, or subjected to the current control by the electronic control unit 120, independently execute the adjustment control of the hydraulic pressure respectively supplied to the hydraulic actuators ACT1 to ACT5 and the accumulator ACM, which functions as the hydraulic pressure source when the engine 30 is stopped, and respectively control the operating hydraulic pressure PC1, PC2, PB1, PB2, PB3, PACM of the clutches C1, C2, the brakes B1, B2, B3, and the accumulator ACM. Each of the gears GS of the automatic transmission 12 is established when any two of the predetermined friction engagement devices are engaged as shown in the operation table of FIG. 2, for example. In the gear change control of the automatic transmission 12, a so-called clutch-to-clutch gear change is made by engagement shifting of the disengagement-side friction engagement device and the engagement-side friction engagement device of the clutch C and the brake B that are involved in the gear change, for example. During this clutch-to-clutch gear change, disengagement transition hydraulic pressure of the disengagement-side friction engagement device and engagement transition hydraulic pressure of the engagement-side friction engagement device are appropriately controlled such that the gear change is made as soon as possible while a gear change shock is suppressed. For example, as shown in the engagement operation table in FIG. 2, the brake B3 is disengaged and the clutch C2 is engaged in an upshift from the third gear to the fourth gear. Accordingly, the disengagement transition hydraulic pressure of the brake B3 and the engagement transition hydraulic pressure of the clutch C2 are appropriately controlled so as to suppress the gear change shock.

Figure 5:
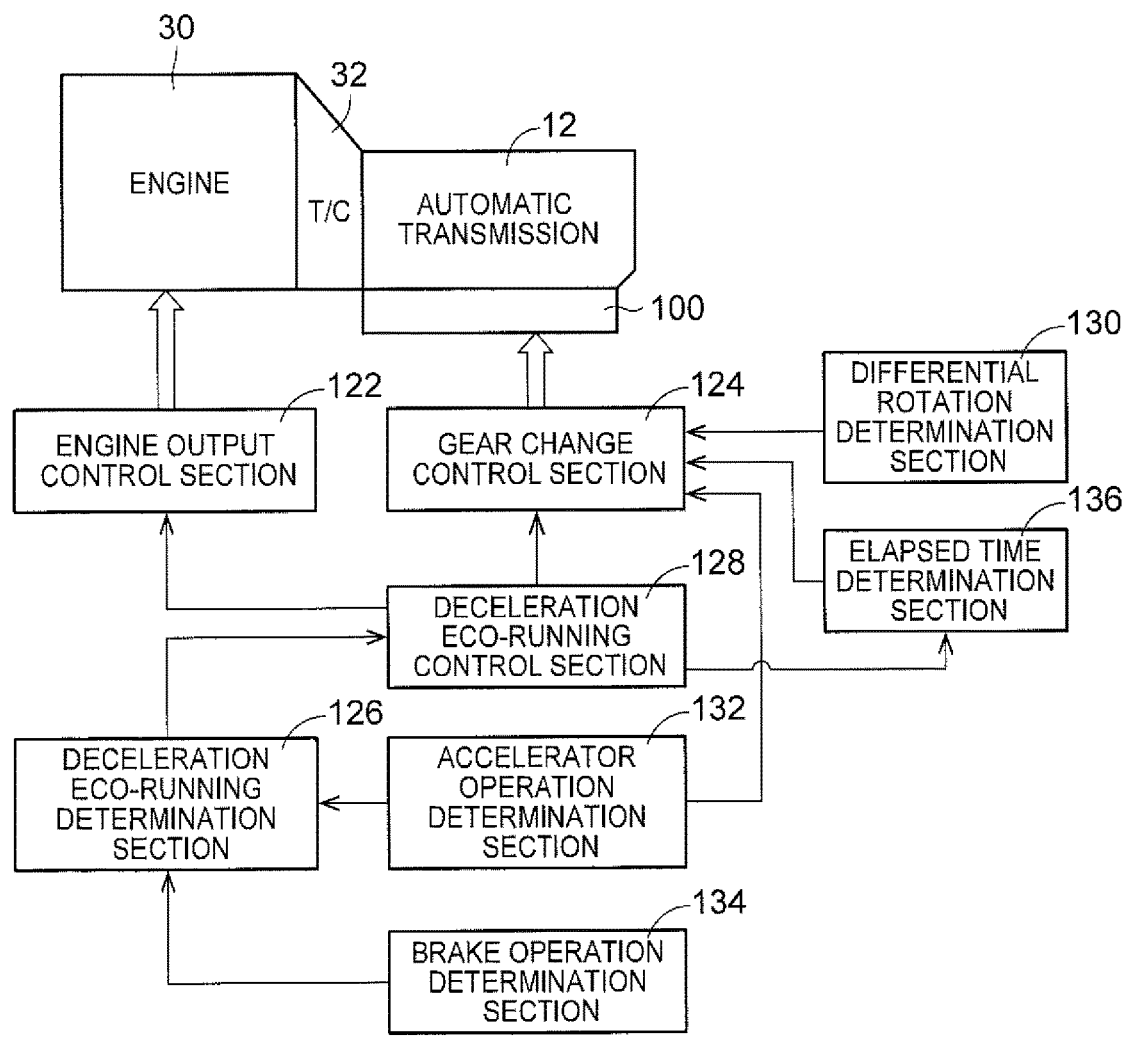
FIG. 5 is a functional block diagram for explaining main sections of a control function of an electronic control unit in FIG. 3.

FIG. 5 is a functional block diagram for explaining main sections of a control function by the electronic control unit 120. In FIG. 5, in order to obtain requested output that corresponds to the accelerator operation amount, an engine output control section 122 outputs the engine output control command signal SE for controlling opening/closing of the electronic throttle valve by the throttle actuator for throttle control, also for controlling the fuel injection amount by the fuel injector for fuel injection amount control, and for controlling an ignition device such as the igniter for ignition timing control, for example. For example, the engine output control section 122 controls opening/closing of the electronic throttle valve so as to obtain the throttle valve opening degree θTH, with which target engine torque is obtained, on the basis of the actual engine speed NE from a relationship (an engine torque map) between the engine speed NE and an estimated value of engine torque (hereinafter estimated engine torque). The relationship uses the throttle valve opening degree θTH as a parameter and is computed and stored in advance from an experiment. In addition to the above, the engine output control section 122 controls the fuel injection amount by the fuel injector and controls the ignition device such as the igniter.

A gear change control section 124 makes a gear change determination on the basis of the actual vehicle speed V and the actual accelerator operation amount Acc from a relationship (a gear change map, a gear change graph) that is stored in advance by using the vehicle speed V and the accelerator operation amount Acc as variables, for example, and determines whether to make the gear change of the automatic transmission 12. Then, the gear change control section 124 determines the gear GS to be changed in the automatic transmission 12 and outputs a gear change command for executing the automatic gear change control of the automatic transmission 12 so as to obtain the determined gear GS. For example, the gear change control section 124 outputs the hydraulic pressure control command signal (a gear change output command value) SP, which is used to engage and/or disengage the hydraulic friction engagement devices involved in the gear change of the automatic transmission 12, to the hydraulic pressure control circuit 100 such that the gear GS is established in accordance with the operation table shown in FIG. 2.

The hydraulic pressure control command signal SP is a torque command value for controlling the torque transmission capacity (clutch torque) of the clutch C or the brake B, that is, a hydraulic pressure command value for generating the operating hydraulic pressure, at which the required torque transmission capacity is obtained. For example, as a torque command value for the disengagement-side friction engagement device, the hydraulic pressure command value for discharging the operating hydraulic pressure is output such that a required torque transmission capacity for disengagement of the disengagement-side friction engagement device is obtained. At the same time, as a torque command value for the engagement-side friction engagement device, the hydraulic pressure command value for feeding the operating hydraulic pressure is output such that a required torque transmission capacity for engagement of the engagement-side friction engagement device is obtained. Furthermore, when the gear change is not made so as to maintain any of the gears GS of the automatic transmission 12, the hydraulic pressure command value for generating the operating hydraulic pressure, at which a friction force that can endure transmission input torque TIN can be retained (that is, the torque transmission capacity can be secured), is output.

The hydraulic pressure control circuit 100 operates the linear solenoid valves SL1 to SL5 and the on/off solenoid valve SV1 in the hydraulic pressure control circuit 100 and operates each of the hydraulic actuators ACT1 to ACT5 and the accumulator ACM of the friction engagement devices that are involved in establishment (setting) of the gear GS such that the gear change of the automatic transmission 12 is made or that the current gear GS of the automatic transmission 12 is maintained in accordance with the hydraulic pressure control command signal SP from the gear change control section 124.

Here, in the vehicle 10 of this embodiment, the so-called deceleration eco-running control, in which an operation of the engine 30 is temporarily stopped and a power transmission passage is opened, is executed in order to reduce fuel consumption during a deceleration travel of the vehicle, for example. This deceleration eco-running control is the control in which, in the case where a predetermined specified deceleration eco-running start condition is satisfied, for example, the engine output control command signal SE is output from the engine output control section 122 to stop the engine 30, the clutch C1 is brought into the disengaged state, and the power transmission passage in the automatic transmission 12 is brought into a power transmission suppression state. The clutch C1 is the friction engagement device for a forward travel that establishes the forward transmission gear immediately before a start of the deceleration eco-running control when being engaged.

More specifically, a deceleration eco-running determination section 126 determines whether the specified deceleration eco-running start condition is established when the shift lever 96 is in the travel position, for example. This specified eco-running start condition is established when the followings are satisfied during the deceleration travel, that is, during a non-acceleration travel of the vehicle, with the lever position PSH being in the "D" position: the vehicle speed V is lower than a specified vehicle speed determination value V0 for determining whether the vehicle speed V is a vehicle speed at which deceleration eco-running is started; the accelerator operation amount Acc is a specified operation amount zero determination value for determining that an accelerator is off; and the signal indicative of the operation BON is output from the brake switch 90.

In addition, the deceleration eco-running determination section 126 sequentially determines whether to cancel (terminate) the deceleration eco-running control by determining whether a specified deceleration eco-running cancellation condition is established during the deceleration eco-running control by a deceleration eco-running control section 128. This specified deceleration eco-running cancellation condition is established, for example, when the followings are satisfied during the deceleration eco-running by the deceleration eco-running control section 128: the acceleration operation amount becomes at least equal to a specified acceleration operation amount determination value at which it is determined that the accelerator pedal 78 is operatively depressed, and the signal indicative of the operation BON is no longer output from the brake switch 90. Alternatively, the specified deceleration eco-running cancellation condition is established, for example, when the followings are satisfied during the deceleration eco-running by the deceleration eco-running control section 128: it is not determined that the accelerator pedal 78 is operatively depressed, and the signal indicative of the operation BON is not output from the brake switch 90, but a timer is operated because a state where an amount of electricity consumption is large at least continues for a specified time. This timer is operated for a purpose of protecting a battery.

An accelerator operation determination section 132 is an accelerator operation-on determination section that determines whether a depressing operation of the accelerator pedal 78 is performed, that is, whether the accelerator is turned on, for example, on the basis of whether the accelerator operation amount Acc exceeds the specified operation amount zero determination value for determining that the accelerator is off when the deceleration eco-running control is started by the deceleration eco-running control section 128. The accelerator operation determination section 132 is also an accelerator operation-off determination section that determines whether the depressing operation of the accelerator pedal 78 is not performed, that is, whether the accelerator is turned off when the deceleration eco-running control is cancelled by the deceleration eco-running control section 128.

A brake operation determination section 134 is a brake-on operation determination section 134 that determines whether the signal indicative of the brake operation BON of the foot brake pedal 92 is input, that is, whether the brake is turned on, for example, on the basis of whether the signal indicative of the brake operation BON of the foot brake pedal 92 is input when the deceleration eco-running control is started by the deceleration eco-running control section 128. The brake operation determination section 134 is also a brake-off operation determination section 134 that determines whether the signal indicative of the brake operation BON is not input, that is, whether the brake is turned off when the deceleration eco-running control is cancelled by the deceleration eco-running control section 128.

Figure 6:
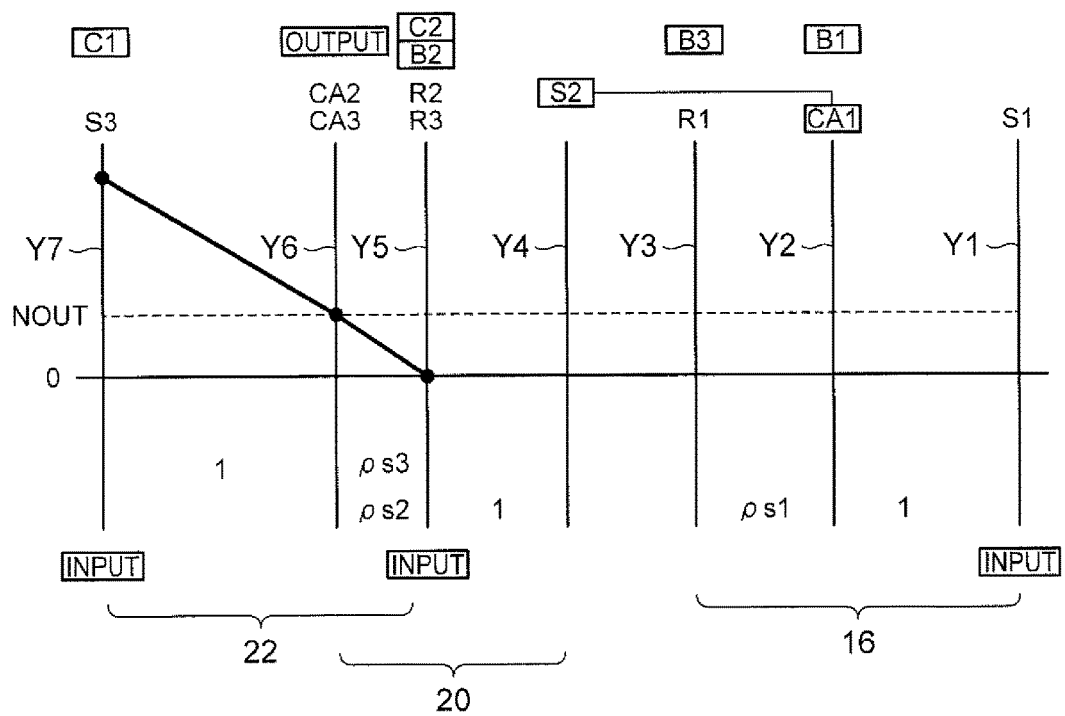
FIG. 6 is a collinear diagram that shows a relative relationship of rotational speeds of rotational devices for each of the plurality of gears of the automatic transmission in FIG. 1 on straight lines.

If the deceleration eco-running determination section 126 determines that the deceleration eco-running control cancellation condition is established, the engine output control section 122 starts the engine 30. Thereafter, in order to establish the first gear, the gear change control section 124 simultaneously starts engaging the brake B2 and starts half-engaging the clutch C2, and then starts engaging the clutch C1. FIG. 6 is a collinear diagram that shows a relationship between a rotational speed of the sun gear S3 and the rotational speed NOUT of the output gear 28 from a time point when engagement of the brake B2 is completed and a rotational speed of the ring gear R2 (R3) becomes zero to a time point when the first gear is established. The collinear diagram of FIG. 6 is a two-dimensional coordinate that represents a relative relationship of gear ratios ρs1, ρs2, ρs3 of the planetary gear devices 16, 20, 22 in a horizontal-axis direction and indicates a relative rotational speed in a vertical-axis direction. A horizontal-axis solid line indicates a rotational speed "zero", and a horizontal-axis broken line on an upper side indicates the rotational speed NOUT of the output gear 28. In regard to seven vertical lines Y1 to Y7, from the right side, Y1 indicates a relative rotational speed of the sun gear S1, Y2 indicates a relative rotational speed of the carrier CA1, Y3 indicates a relative rotational speed of the ring gear R1 of the first planetary gear device 16, Y4 indicates a relative rotational speed of the sun gear S2, Y5 indicates a relative rotational speed of the ring gear R2 (R3), Y6 indicates a relative rotational speed of the carrier CA2 (CA3) of the second planetary gear device 20, and Y7 indicates a relative rotational speed of the sun gear S3 of the third planetary gear device 22. An oblique straight line that is indicated by a solid line is a straight line that is defined when the second brake B2 is completely engaged. An intersection between this oblique straight line and Y6 indicates the rotational speed of the carrier CA2 that is coupled to the output gear 28, and an intersection between the oblique straight line and Y7 indicates the rotational speed of the sun gear S3.

Returning to FIG. 5, a differential rotation determination section 130 determines a difference between the turbine rotational speed NT (rpm) as a rotational speed of the torque converter 32 detected by the turbine rotational speed sensor 98, that is, the input shaft rotational speed NIN or the rotational speed of the input shaft 26, and the rotational speed of the sun gear S3 calculated from the output rotational speed NOUT of the output gear 28 detected by the vehicle speed sensor 88 and the gear ratio ρs3 that is, differential rotation between the input shaft rotational speed NIN and the sun gear S3. This differential rotation is also differential rotation between an input side and an output side of the clutch C1.

A time point at which the deceleration eco-running control cancellation condition is established, at which a command signal (an engine recovery command signal) is output from the deceleration eco-running determination section 126, and at which a command signal is output from the deceleration eco-running control section 128 to an elapsed time determination section 136 is set as a starting point. Then, the elapsed time determination section 136 determines whether an elapsed time T from the above time point exceeds a preset time period Te.

Figure 7:
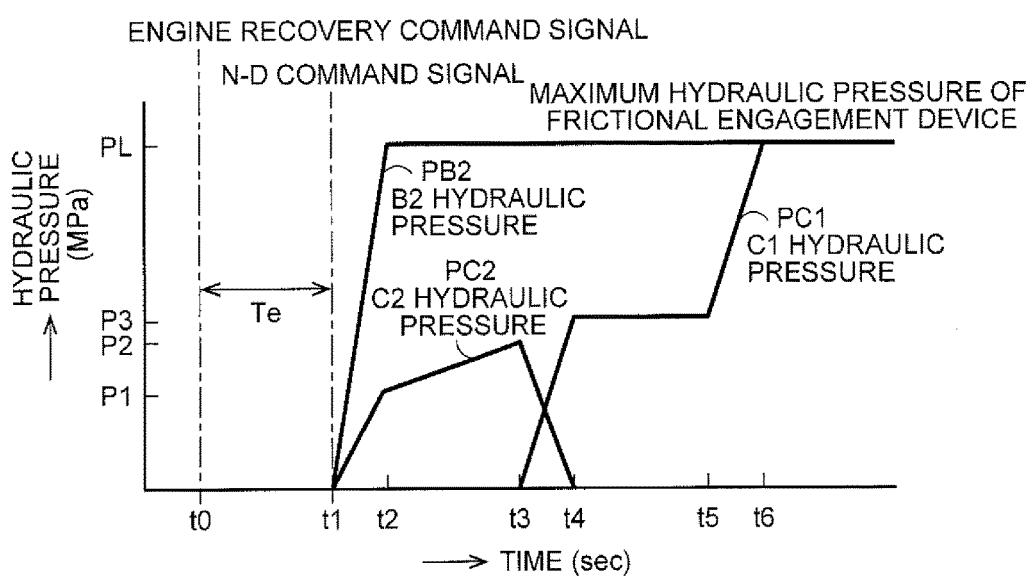
FIG. 7 is a time chart for explaining main portions of the operations of the friction engagement devices in FIG. 1 at a time of switching from a neutral state to a drive state by an accelerator-on operation during deceleration eco-running.
Figure 8:
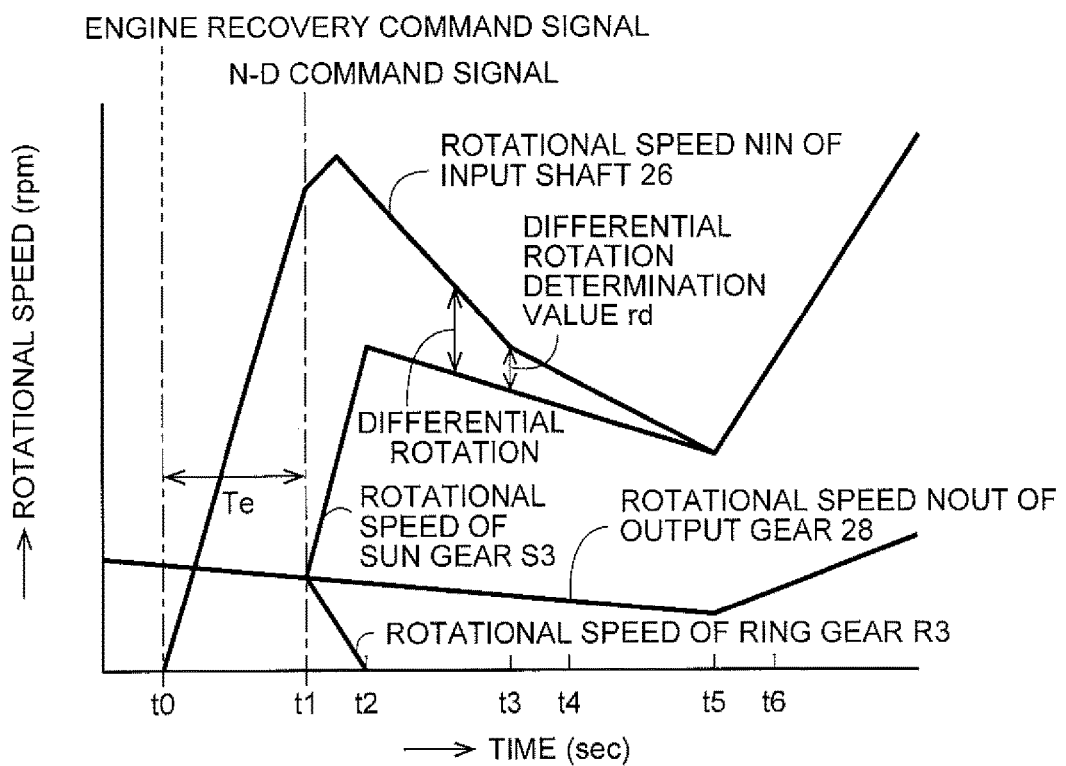
FIG. 8 is a time chart that shows changes in the rotational speeds.

FIG. 7 is a time chart that shows the operations of the friction engagement devices at a time of switching from the neutral state to a drive state by an operation of the accelerator during a deceleration eco-running when the engine 30 is stopped. In the case where the difference between the input shaft rotational speed NIN of the automatic transmission 12 and the rotational speed of the sun gear S3 is large, a heat generation amount of the starting clutch for establishing the forward gear, that is, the clutch C1 that functions as the first friction engagement device becomes large. Accordingly, durability of the clutch C1 is possibly degraded. FIG. 8 shows an operation of the rotational speed of each member for reducing the heat generation amount of the clutch C1 during an engine-start. More specifically, before the hydraulic pressure starts being fed for the engagement of the clutch C1, the clutch C2 that functions as a second friction engagement device and that does not establish the first gear is half-engaged. Then, after the rotational speed of the input shaft 26 of the automatic transmission 12, to which rotation of the engine is input, is reduced, the clutch C1 that establishes the first gear is engaged. In this way, heat generation by the clutch C1 that establishes the first gear is reduced so as to improve the durability. In addition, a shock during the engagement is reduced, and abnormal sound in a drive system is also reduced. The clutch C2 and the brake B2 that are coupled in series between the input shaft 26 and the case 14 function as brakes for the input shaft 26. The clutch C2 that does not establish the first gear is switched to the clutch C1 that establishes the first gear at a time point when the differential rotation between the input shaft rotational speed NIN as the rotational speed of the input shaft 26 and the rotational speed of the sun gear S3, that is, differential rotation between an input-side rotational speed and an output-side rotational speed of the clutch C1 becomes at most equal to a specified determination value (a differential rotation determination value rd). This determination is made by the differential rotation determination section 130, and the operations of the friction engagement devices are controlled by an output signal from the gear change control section 124.

When the deceleration eco-running control cancellation condition is established, the command signal (the engine recovery command signal) is output from the deceleration eco-running determination section 126. Then, via the deceleration eco-running control section 128, the engine output control section 122 starts the engine 30 (a time point t0 in FIG. 7). After a lapse of the preset time period Te (=t1−t0), based on a command signal (an N-D command signal) from the elapsed time determination section 136, the gear change control section 124 outputs a command signal to the hydraulic pressure control circuit 100. The line hydraulic pressure PL that is fed from the hydraulic pressure supply device 102 is adjusted to become the operating hydraulic pressure PB2 and is fed to the hydraulic actuator ACT4. In this way, the brake B2 starts being engaged (a time point t1 in FIG. 7). The drive hydraulic pressure PD that is fed from the hydraulic pressure supply device 102 at the same time as the above is adjusted to become the operating hydraulic pressure PC2 on the basis of the command signal from the gear change control section 124 and is fed to the hydraulic actuator ACT2. In this way, the clutch C2 starts being half-engaged (the time point t1 in FIG. 7). The engagement of the brake B2 and the half-engagement of the clutch C2 are started after the lapse of the preset time period Te. However, the engagement of the brake B2 and the half-engagement of the clutch C2 may be started at a time point when the engine speed exceeds a predetermined speed, for example. It should be noted that, while the first gear is established by the brake B2 and the clutch C1, the clutch C2 is the friction engagement device that does not establish the first gear but establishes the fourth gear to the sixth gear. The hydraulic pressure PB2 that is related to the complete engagement of 132 reaches the maximum hydraulic pressure (the line hydraulic pressure) PL thereof on the basis of the command signal of the gear change control section 124, and B2 is completely engaged (a time point t2 in FIG. 7). Then, based on the command signal from the gear change control section 124, the hydraulic pressure PC2 that is related to the engagement of C2 is gradually increased at a preset rate from hydraulic pressure P1, at which C2 is half-engaged, while maintaining the half-engagement. At a time point when the difference between the input shaft rotational speed NIN and the rotational speed of the sun gear S3 becomes at most equal to the differential rotation determination value rd, a command signal from the differential rotation determination section 130 is output to the gear change control section 124. Then, the gear change control section 124 stops feeding the hydraulic pressure PC2 and starts discharging the hydraulic pressure PC2 from C2 (a time point t3 in FIG. 7). The drive hydraulic pressure PD that is fed from the hydraulic pressure supply device 102 at the same time as the above is adjusted to become the operating hydraulic pressure PC1 on the basis of the command signal from the gear change control section 124 and is fed to the hydraulic actuator ACT1. In this way, the clutch C1 starts being engaged (the time point t3 in FIG. 7). The gear change control section 124 increases the hydraulic pressure PC1 that is related to the engagement of the clutch C1 to preset hydraulic pressure P3 while maintaining the half-engagement of the clutch C1 (a time point t4 in FIG. 7). Meanwhile, because feeding of the hydraulic pressure PC2 that is related to the engagement of the clutch C2 is stopped, the clutch C2 is completely disengaged (the time point t4 in FIG. 7). After the hydraulic pressure PC1 that is related to the engagement of the clutch C1 is maintained at P3, the clutch C1 is completely engaged (a time point t5 in FIG. 7). Then, the gear change control section 124 increases the hydraulic pressure PC1 that is related to the engagement of the clutch C1 to the maximum hydraulic pressure (the line hydraulic pressure) PL and maintains the engagement of the clutch C1 (a time point t6 in FIG. 7).

FIG. 8 is a time chart of the rotational speeds. In FIG. 8, when the deceleration eco-running control cancellation condition is established, the command signal (the engine recovery command signal) is output from the deceleration eco-running determination section 126. Then, via the deceleration eco-running control section 128, the engine output control section 122 starts the engine 30 (a time point t0). In conjunction with this, the input shaft rotational speed NIN of the input shaft 26 is increased (time points t0 to t1). Meanwhile, the rotational speeds of the sun gear S3 and the ring gear R3 are the same as a rotational speed of the carrier CA3, that is, the output rotational speed NOUT of the output gear 28 (the time points t0 to t1). However, when the brake B2 starts being engaged (the time point t1), the rotational speed of the sun gear S3 is increased, and the rotational speed of the ring gear R3 is reduced (time points t1 to t2). A ratio of a difference in rotational speed between the sun gear S3 and the output gear 28 to a difference in rotational speed between the ring gear R3 and the output gear 28 is constant and is defined by the gear ratio (=number of teeth of the sun gear/number of teeth of the ring gear) ρs1 of the third planetary gear device 22. When B1 is completely engaged, the rotational speed of the ring gear R3 becomes zero (the time point t2). At this time point, the clutch C2 that is not related to the establishment of the first gear is half-engaged, and, due to friction generated by this, the input shaft rotational speed NIN is reduced. The gear change control section 124 gradually increases the hydraulic pressure that is related to the clutch C2 at the predetermined rate while maintaining the half-engagement of the clutch C2. Then, the gear change control section 124 further reduces the input shaft rotational speed NIN, and even further reduces the input shaft rotational speed NIN until the difference between the input shaft rotational speed NIN and the rotational speed of the sun gear S3 equals to the differential rotation determination value rd. When the difference between the input shaft rotational speed NIN and the rotational speed of the sun gear S3 reaches the differential rotation determination value rd (a time point t3), the command signal is output from the differential rotation determination section 130 to the gear change control section 124. While stopping the hydraulic pressure related to the clutch C2, the gear change control section 124 increases the hydraulic pressure that is related to the establishment of the first gear so as to set it to the hydraulic pressure, at which the clutch C1 is engaged, after the half-engagement (a time point t4) state. The input shaft rotational speed NIN further continues to be reduced by the friction that is generated by the half-engagement of the clutch C1 and is then completely engaged (a time point t5). By the complete engagement of the clutch C1, the rotational speed of the sun gear S3 becomes the same as the input shaft rotational speed NIN. Meanwhile, the output rotational speed of the carrier CA3, that is, the rotational speed NOUT of the output gear 28 is gradually reduced from t0 and is shifted to an increase at t5.

FIG. 9 is a flowchart for explaining main portions of a control operation of the electronic control unit 120, which is shown in FIG. 7 and FIG. 8, and is repeatedly executed.

In FIG. 9, first, in step (hereinafter step will not be mentioned) S1 that corresponds to the operation of the deceleration eco-running determination section 126, the deceleration eco-running determination section 126 sequentially determines whether to start the deceleration eco-running control by determining whether the specified deceleration eco-running start condition is established, for example. If the determination of this S1 is negative, this routine is terminated. However, if this determination is positive, a deceleration eco-running control start command signal is output, for example, and the deceleration eco-running control is started in S2 that corresponds to the operation of the deceleration eco-running control section 128. Due to output of this deceleration eco-running control start command signal, the engine output control section 122 outputs the engine output control command signal SE for stopping the engine 30 to the engine 30, and the gear change control section 124 shifts the hydraulic pressure control command signal to the clutch C and the brake B to the disengagement side.

In S3 that corresponds to the operation of the deceleration eco-running determination section 126, if the specified deceleration eco-running cancellation condition is established, for example, if the acceleration operation amount becomes at least equal to a specified acceleration operation amount determination value, at which it is determined that the accelerator pedal 78 is operatively depressed, and the signal indicative of the operation BON is no longer output from the brake switch 90 during the deceleration eco-running by the deceleration eco-running control section 128, or, for example, if it is not determined that the accelerator pedal 78 is operatively depressed, and the signal indicative of the operation BON is not output from the brake switch 90, but a state where the amount of the electricity consumption is large continues at least for the specified time, and a timer is thereby operated during the deceleration eco-running by the deceleration eco-running control section 128, the establishment of the deceleration eco-running cancellation condition is determined.

If the determination in S3 is positive, in S4 that corresponds to the engine output control section 122, a signal for output control of the engine 30 is output, and the engine 30 is restarted.

After the engine is restarted, in S5 that corresponds to the operation of the elapsed time determination section 136, it is determined whether the preset time period Te has elapsed. If the determination in this S5 is positive, that is, if the time period Te has elapsed, in S6 that corresponds to the operation of the elapsed time determination section 136, the command signal (the N-D command signal) is transmitted to the gear change control section 124. In S7 that corresponds to the operation of the gear change control section 124, feeding of the hydraulic pressure PB2 to the brake B2 and the adjustment feeding of the hydraulic pressure PC2 for making C2 half-engaged are started via the hydraulic pressure control circuit 100.

In S8 that corresponds to the operation of the differential rotation determination section 130, it is determined whether the difference between the input shaft rotational speed NIN and the rotational speed of the sun gear S3, that is, the differential rotation becomes at most equal to the differential rotation determination value rd. The input shaft rotational speed NIN is the same as the rotational speed of the torque converter 32 that is detected by the turbine rotational speed sensor 98 and is computed from the rotational speed of the torque converter 32. In addition, the rotational speed of the sun gear S3 is computed from the output rotational speed NOUT, which is the rotational speed of the output gear 28 corresponding to the vehicle speed V (km/h) detected by the vehicle speed sensor 88, and the gear ratio ρs3.

If the determination in S8 is positive, in S9 that corresponds to the operation of the gear change control section 124, feeding of the hydraulic pressure PC2 that is related to the engagement of the clutch C2 is stopped, and the hydraulic pressure PC2 starts being drained, At the same time, adjustment feeding of the hydraulic pressure to the clutch C1 is started in a preset increase pattern that does not allow the clutch C1 to be shifted from the half-engagement to the engagement in a short time.

In S10 that corresponds to the operation of the differential rotation determination section 130, it is determined whether the difference between the output rotational speed NOUT, which is the rotational speed of the output gear 28 corresponding to the vehicle speed V (km/h) detected by the vehicle speed sensor 88, and the rotational speed of the sun gear S3, that is, the differential rotation becomes a specified rotational speed difference in such a degree that the differential rotation can be considered to be zero. In this way, the complete engagement of the clutch C1 is confirmed.

If the determination in S10 is positive, in S11 that corresponds to the operation of the gear change control section 124, the hydraulic pressure PC1 to the clutch C1 is increased to the maximum hydraulic pressure of the friction engagement device, so as to secure the engagement.

As described above, in the electronic control unit 120 of the automatic transmission 12 for the vehicle in this embodiment, the engagement of the clutch C1 is suppressed from being started, and the rotational speed of the input shaft 26 of the automatic transmission 12 is suppressed from being increased due to an increase in rotation resistance of the input shaft 26 of the automatic transmission 12, which occurs by the half-engagement of the clutch C2, Thereafter, the clutch C2 is disengaged, and the clutch C1 is completely engaged. In this way, the clutch C1 is completely engaged after the rotational speed of the input shaft 26 is suppressed from being increased. Thus, the heat generation amount of the clutch C1 can be reduced, and the durability of the clutch C1 can further be increased due to a reduction in the heat generation amount.

In addition, in the electronic control unit 120 of the automatic transmission 12 for the vehicle in this embodiment, the engagement of the clutch C1 is started after the rotational speed of the input shaft 26 is reduced, and the differential rotation between the input side of the clutch C1, that is, the rotational speed of the input shaft 26 and the output side thereof, that is, the rotational speed of the sun gear S3 becomes at most equal to the specified determination value rd. Therefore, a starting shock due to the engagement of the clutch C1 can be reduced, and the abnormal sound in the drive system can also be reduced.

In the electronic control unit 120 of the automatic transmission 12 for the vehicle in this embodiment, the clutch C2 and the brake B2 that are coupled in series between the input shaft 26 and the case 14 function as the brakes for the input shaft 26. Thus, due to the engagement of the brake B2 and the half-engagement of the clutch C2, the rotational speed of the input shaft 26 is suitably reduced prior to the establishment of the first gear.

The detailed description has been made so far on the embodiment on the basis of the drawings. However, the disclosure is also applied to other aspects.

For example, when the vehicle is started from a stopped state where the engine rotates at a high speed for warming or the like, that is, during a garage shift, for example, the difference between the rotational speed on the input side, which is input to the clutch C1 of the automatic transmission 12, that is, the starting clutch, and the rotational speed on the output side of the starting clutch possibly becomes large. Thus, the present control device and the control method can also be applied to such a case. That is, in the case where the difference between the rotational speed of the input shaft 26 of the automatic transmission 12, to which the rotation of the engine is input, and the rotational speed of the rotational member (the sun gear S3), which rotates in proportion to an output shaft rotational speed of the automatic transmission 12, that is, the rotational speed of the output gear 28 is large when the automatic transmission 12 is switched from the neutral state to the first gear, the heat generation amount of the starting clutch that establishes the starting gear is increased, and the durability of the starting clutch is possibly degraded. To deal with this concern, by control of the friction engagement device that is similar to a restart of the engine from the deceleration eco-running, the friction engagement device can be operated during a vehicle-start so as to reduce the heat generation amount of the starting clutch. A time chart for such a vehicle-start from the stopped state where the engine rotates at the high speed for warming or the like is similar but slightly differs from the time chart for the engine-start during the deceleration eco-running. When the vehicle is started, which is accompanied by the engine-start, the rotational speed NOUT of the output gear 28 and the rotational speed of the sun gear S3 in FIG. 8 remain zero until time that is immediately before the vehicle-start. In this point, the time chart differs from the time chart during the deceleration eco-running in FIG. 8. However, control for reducing the input shaft rotational speed NIN by the half-engagement of the clutch C2, disengaging the clutch C2 at the time point when the rotational speed thereof becomes at most equal to the specified rotational speed (corresponding to the differential rotation determination value rd in the deceleration eco-running), half-engaging the clutch C1 instead of the clutch C2, and increasing the hydraulic pressure PC1 related to the clutch C1 to the maximum hydraulic pressure at the time point when the differential rotation becomes the specified rotational speed difference in such a degree that the differential rotation can be considered to be zero is the same as the control of the friction engagement device during the engine-start from an engine-stop in the deceleration eco-running in terms of the operation of each of the friction engagement devices as well as the purpose and the effects thereof.

Instead of always executing the gear change control of the friction engagement device by half-engaging the clutch C2 prior to the establishment of the first gear, it may be determined whether to execute the gear change control for half-engaging the clutch C2 by using an increase rate of the engine speed, the accelerator operation amount, or the like as a threshold, for example.

The automatic transmission 12 of the above-described embodiment includes the brake B2 as the third friction engagement device. However, in addition to the brake B2, the automatic transmission 12 may include a one-way clutch.

The automatic transmission 12 of the above-described embodiment is the automatic transmission of a planetary gear type that includes the three planetary gear devices 16, 20, 22 and has the six forward gears. However, the number of the planetary gear devices and the number of the forward gears may be other than those.

Although not illustrated, the control device and the control method can be implemented even when various changes are added thereto within a range that does not depart from the gist thereof.

What is claimed is:

1. A control device for an automatic transmission of a vehicle,
    the automatic transmission including a plurality of friction engagement devices, an input shaft, an output member, and a non-rotational member,
    the plurality of friction engagement devices including a first friction engagement device, a second friction engagement device, and a third friction engagement device, a first gear being established when the first friction engagement device is engaged,
    the automatic transmission including planetary gear devices, the planetary gear devices including two single-pinion planetary gear devices and one double-pinion planetary gear device, and at least one of the planetary gear devices includes:
        a carrier being configured to be coupled to the output member,
        a sun gear being configured to be selectively coupled to the input shaft via the first friction engagement device, and
        a ring gear being configured to be selectively coupled to the input shaft via the second friction engagement device and be selectively coupled to the non-rotational member via the third friction engagement device,
    the control device comprising,
    in a process of switching the automatic transmission from a neutral state to a power transmission state, none of gears being established in the neutral state and the first gear being established in the power transmission state, an electronic control unit configured to:
        control the second friction engagement device to be temporarily half-engaged prior to complete engagement of the first friction engagement device, the second friction engagement device being not related to establishment of the first gear; and
        start engaging both the third friction engagement device and the second friction engagement device at the same time in response to a start of a gear change from the neutral state to the first gear.

2. The control device according to claim 1, wherein the electronic control unit is configured to start engaging the first friction engagement device after reducing differential rotation between an input-side rotational speed and an output-side rotational speed of the first friction engagement device to be at most equal to a specified determination value by the half-engagement of the second friction engagement device.

3. The control device according to claim 1, wherein the electronic control unit is configured to control the third friction engagement device to be completely engaged at a same time in which it controls the second friction device to be half-engaged.

4. The control device according to claim 1, wherein the electronic control unit is configured to control the first friction engagement device to start engaging at a same time in which the second friction device is disengaging.

5. A control method for an automatic transmission of a vehicle,
    the automatic transmission including a plurality of friction engagement devices, an input shaft, an output member, and a non-rotational member,
    the plurality of friction engagement devices including a first friction engagement device, a second friction engagement device, and a third friction engagement device, a first gear being established when the first friction engagement device is engaged,
    the automatic transmission including planetary gear devices, the planetary gear devices including two single-pinion planetary gear devices and one double-pinion planetary gear device, and at least one of the planetary gear devices includes:
        a carrier being configured to be coupled to the output member,
        a sun gear being configured to be selectively coupled to the input shaft via the first friction engagement device, and
        a ring gear being configured to be selectively coupled to the input shaft via the second friction engagement device and be selectively coupled to the non-rotational member via the third friction engagement device,
    the control method comprising:
        in a process of switching the automatic transmission from a neutral state to a power transmission state, none of gears being established in the neutral state and the first gear being established in the power transmission state,
        temporarily half-engaging the second friction engagement device prior to complete engagement of the first friction engagement device, the second friction engagement device being not related to establishment of the first gear; and
        starting engagement of both the third friction engagement device and the second friction engagement device at the same time in response to a start of a gear change from the neutral state to the first gear.

* * * * *